(12) United States Patent
Yamagiwa et al.

(10) Patent No.: US 6,186,206 B1
(45) Date of Patent: Feb. 13, 2001

(54) TIRE TUBE WITH PINCH PROTECTION

(75) Inventors: Toshio Yamagiwa; Hirohisa Takahashi; Kazuo Suzuki, all of Saitama (JP)

(73) Assignee: Honda Giken Kogyo Kabushiki Kaisha

( * ) Notice: Under 35 U.S.C. 154(b), the term of this patent shall be extended for 0 days.

(21) Appl. No.: 08/768,795

(22) Filed: Dec. 18, 1996

(30) Foreign Application Priority Data

Dec. 18, 1995 (JP) .................................................... 7-328819

(51) Int. Cl.[7] .................................................. B60C 17/00
(52) U.S. Cl. ............................................. 152/520; 152/158
(58) Field of Search .................................. 152/157, 158, 152/520, 522, 195, 517, 532, 555

(56) References Cited

U.S. PATENT DOCUMENTS

| | | | | |
|---|---|---|---|---|
| 598,460 | * | 2/1898 | Young ................................. | 152/532 |
| 730,474 | * | 6/1903 | Rayner ............................... | 152/157 |
| 1,125,129 | * | 1/1915 | Kush ................................... | 152/532 |
| 1,330,732 | * | 2/1920 | Wise ................................... | 152/532 |
| 1,332,309 | * | 3/1920 | Sawyer .............................. | 152/532 |
| 1,829,483 | * | 10/1931 | Hibbert .............................. | 152/532 |
| 3,400,746 | * | 9/1968 | Heimovics .......................... | 152/522 |
| 4,059,138 | * | 11/1977 | Mirtain et al. .................... | 152/522 X |
| 4,203,481 | * | 5/1980 | Ranik, Jr. .......................... | 152/522 X |
| 4,399,851 | * | 8/1983 | Bschorr ............................. | 152/157 X |

FOREIGN PATENT DOCUMENTS 5-201213    8/1993  (JP) .

* cited by examiner

Primary Examiner—Francis J. Lorin
(74) Attorney, Agent, or Firm—Birch, Stewart, Kolasch & Birch, LLP

(57) ABSTRACT

Preventing simply and firmly occurrence of a puncture caused by mutual contact of wall faces of a tube. Thick wall portions are formed at portions of a tube included in a tire and the thick wall portions are brought into contact with thin wall portions when the tire engages on a hazard and the tire and the tube are squeezed between flange portions of a rim and the hazard. The thick wall portions are not damaged since they have an increased strength and also the thin wall portions are protected against damage caused by a load since the load exerting on the thin wall portions is dispersed by the thick wall portions which are readily subjected to elastic deformation. The thin wall portions may be rendered thick wall portions and the thick wall portions may be brought into mutual contact.

19 Claims, 5 Drawing Sheets

TIRE TUBE WITH PINCH PROTECTION

BACKGROUND OF THE INVENTION

1. Field of the Invention

The present invention relates to a tire and a tube wherein the tire is mounted on an outer periphery of a rim and the tube is stored in a space formed by the rim and the tire.

2. Description of Background Art

A tire including a tube are normally mounted on a wheel rim having wire spokes. Such a tire is widely in use together with a motorcycle or a bicycle. The airtightness of this arrangement using a tube is excellent.

In the meantime, when a load in the radial direction is exerted on the wheel mounted with the tire and a tube, the tire and the tube are deformed by the load. Especially, when the tire traverses a solid hazard such as a rock etc. in traveling over off-road places and when the vehicle jumps and touches the ground, the tube is strongly squeezed between the considerably deformed tire and the rim made of metal. A "rim bumping phenomenon" may occur in which the inner wall faces of the tube are mutually brought into contact. When the inner wall faces of the tube are mutually brought into contact by the rim bumping phenomenon, the portion is perforated and a so-called "shock puncture" occurs.

To avoid such a drawback there has been proposed a tire in which a buffer having a crescent-shaped section is interposed between the inner surface of the tread portion of the tire and the outer surface of the tube and the damage of the tube caused by the above-mentioned rim bumping phenomenon is prevented by the buffer. See Japanese Unexamined Patent Publication No. 201213/1993.

However, according to the conventional tire the number of parts is increased by providing a buffer which gives rise to an increase in the weight of the tire and an increase in production cost.

SUMMARY AND OBJECTS OF THE INVENTION

The present invention has been carried out in view of the above-mentioned situation and it is an object thereof to provide a tire including a tube capable of simply and firmly preventing the occurrence of puncture caused by the mutual contact of the wall faces of the tube.

To achieve the above-mentioned object, the present invention provides a tube including a tire comprising a tire mounted on an outer periphery of a rim and a tube stored in a space formed by the rim and the tire, wherein thick wall portions are formed at at least one of inner wall faces of the tube which are mutually brought into contact by being squeezed by the tire and the rim when a load in the radial direction is exerted on the tire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An explanation will be given of the embodiments of the present invention based on examples of the present invention as illustrated in the attached drawings as follows.

Figure 1:
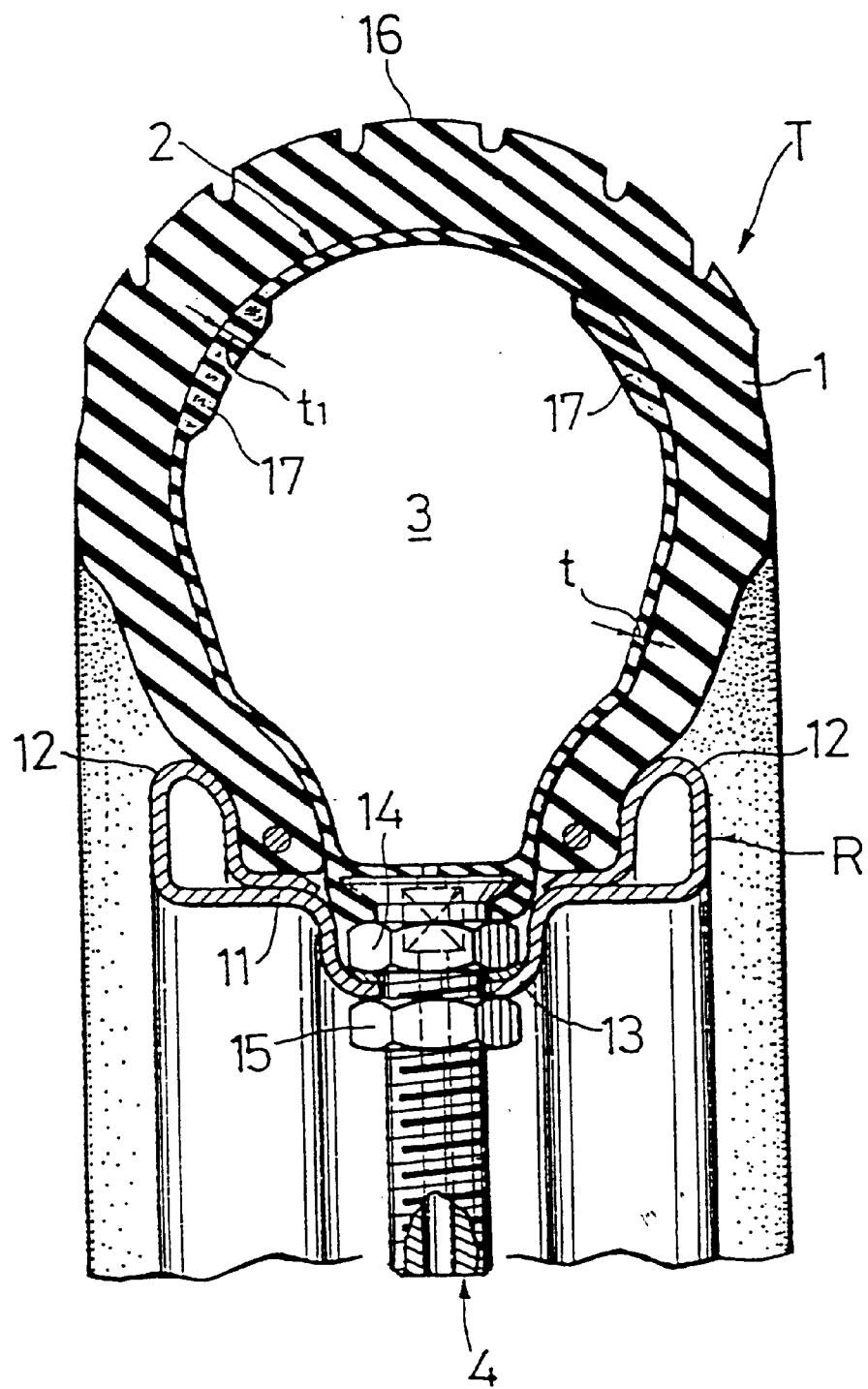
FIG. 1 is a cross-sectional view of a wheel mounted with a tire including a tube in accordance with a first embodiment of the present invention.
Figure 2:
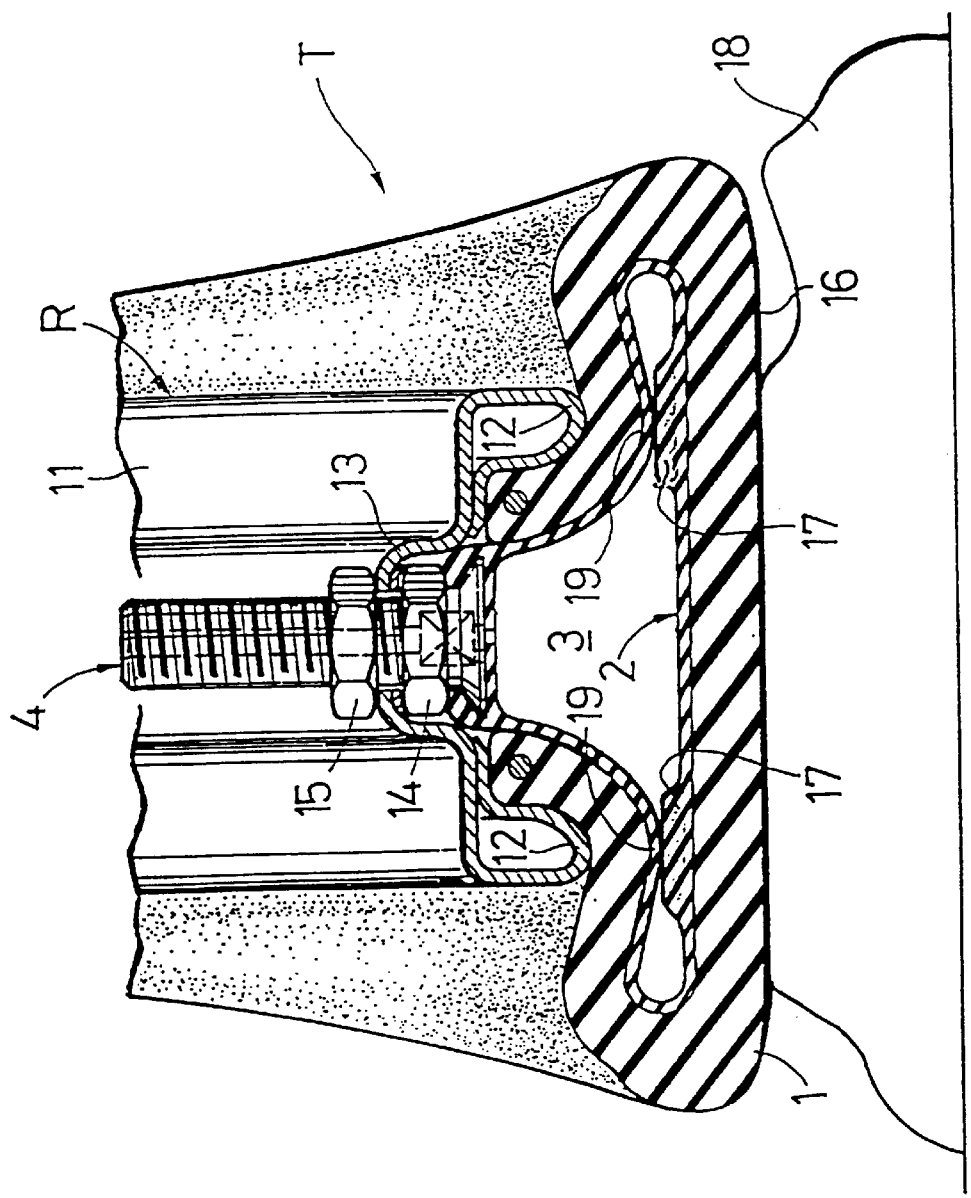
FIG. 2 is an explanatory view of the operation.

FIG. 1 and FIG. 2 illustrate a first embodiment of the present invention in which FIG. 1 is a cross-sectional view of a wheel mounted with a tire including a tube and FIG. 2 is an explanatory view for explaining the operation illustrating a state in which the wheel runs on a hazard.

As illustrated in FIG. 1, a rim R of a wheel for a motorcycle is connected to a hub (not shown) via wire spokes. A tire T including a tube comprising a tire 1 and a tube 2 stored within is mounted on the rim R. The rim R is provided with a ring-like rim main body 11 extending in the circumferential direction of the wheel and a pair of flange portions 12 extending from both ends in the axial direction of the rim main body 11 to the exterior side in the radial direction thereof and holding the inner periphery of the tire 1. An air valve 4 for supplying air to an air chamber 3 that is formed inside of the tube 2, penetrates an air valve attaching portion 13 formed at a location in the circumferential direction of the rim main body portion 11 and is fixed by nuts 14 and 15.

Although the wall thickness of the tube 2 is formed substantially constant, a pair of thick wall portions 17 where the wall thickness is increased, are formed at portions thereof which are disposed at two locations in the cross-sectional face, that is, at the exterior sides in the radial direction of the pair of flange portions 12 of the rim R and which correspond to both ends in the axial direction of a tread portion 16 of the tire 1. The wall thickness ti of the thick wall portions 17 is formed by approximately 1.5 through 3.0 times as much as the wall thickness t of the other portion.

Next, an explanation will be given of the operation of the first embodiment.

When a tire including a tube T engages a hazard 18 on the road and an impact load is exerted thereon as illustrated in FIG. 2, portions of the tire 1 and the tube 2 are compressed in the radial direction by the load. At this moment the tire 1 and the tube 2 are squeezed between the flange portions 12 protruding outwardly in the radial direction and the hazard 18 and the inner wall faces of the tube 2 are mutually brought into contact at the thick wall portions 17 and at wall portions 19. However, no damage is caused at the thick wall portions since the strength thereof is large and also the thin wall portions 19 are similarly protected against damage caused by a load since the load exerted on the thin wall portions 19 is dispersed by the thick wall portions 17 which are readily subjected to elastic deformation.

Furthermore, the generation of a shock puncture can be avoided by a simple structure in which only the thick wall portions 17 having a larger wall thickness than that of the other portions are formed at portions of the tube 2 and the weight or the production cost of the tire T including the tube is not considerably increased.

Figure 3:
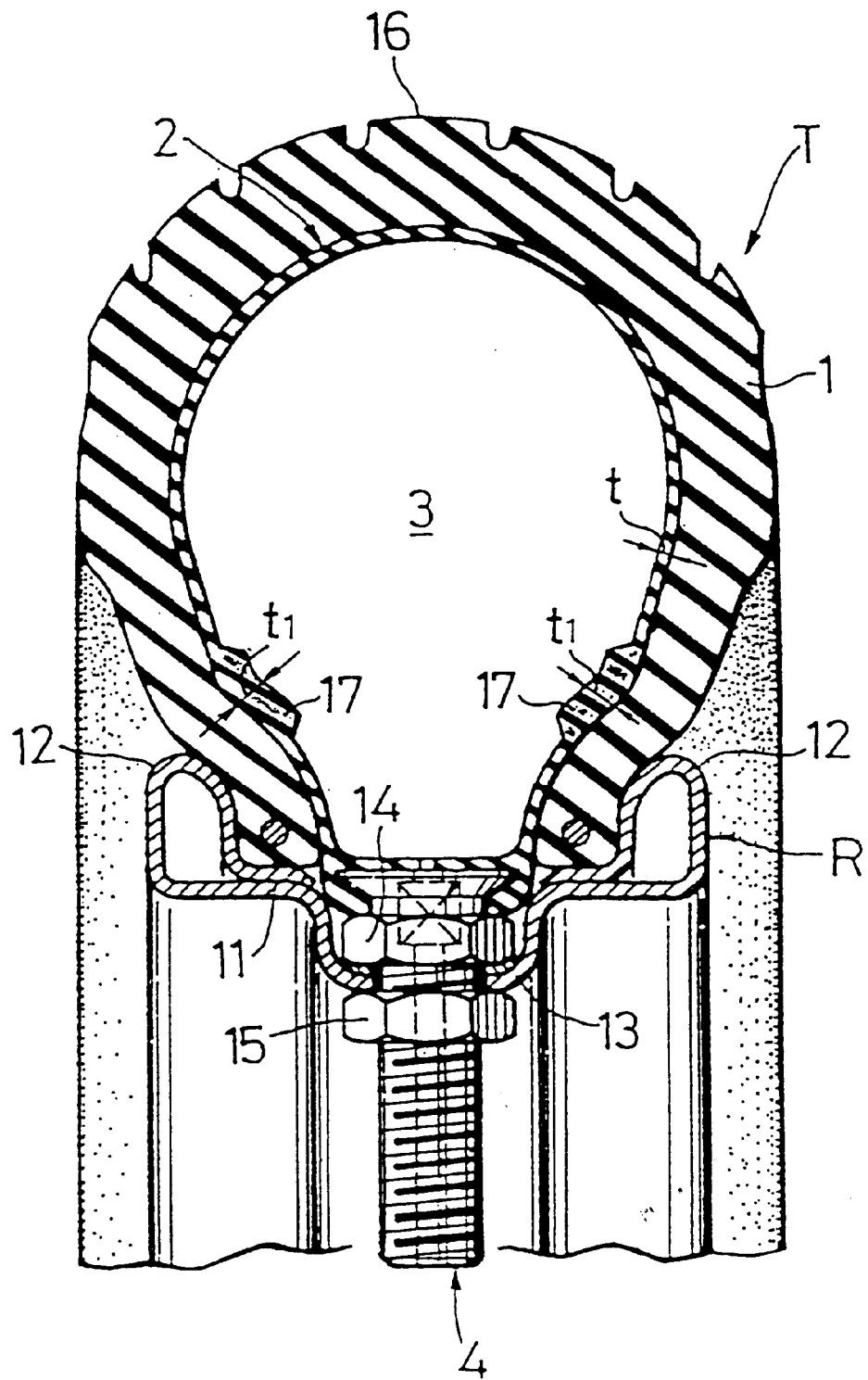
FIG. 3 is a cross-sectional view of a wheel mounted with a tire including a tube in accordance with a second embodiment of the present invention.

FIG. 3 illustrates a second embodiment of the present invention and the second embodiment is different from the first embodiment in that the thick wall portions 17 of the tube 2 are provided in the proximity of the flange portions 12 of the rim R. When the thick wall portions 17 are provided in the proximity of the flange portions 12 in such a way, even if the tire T and the tube 2 are compressed in a direction deviated sideways from the rotational face, the thick wall portions 17 are correctly disposed above the flange portions 12 whereby damage to the tube 2 can more firmly be prevented.

Figure 4:
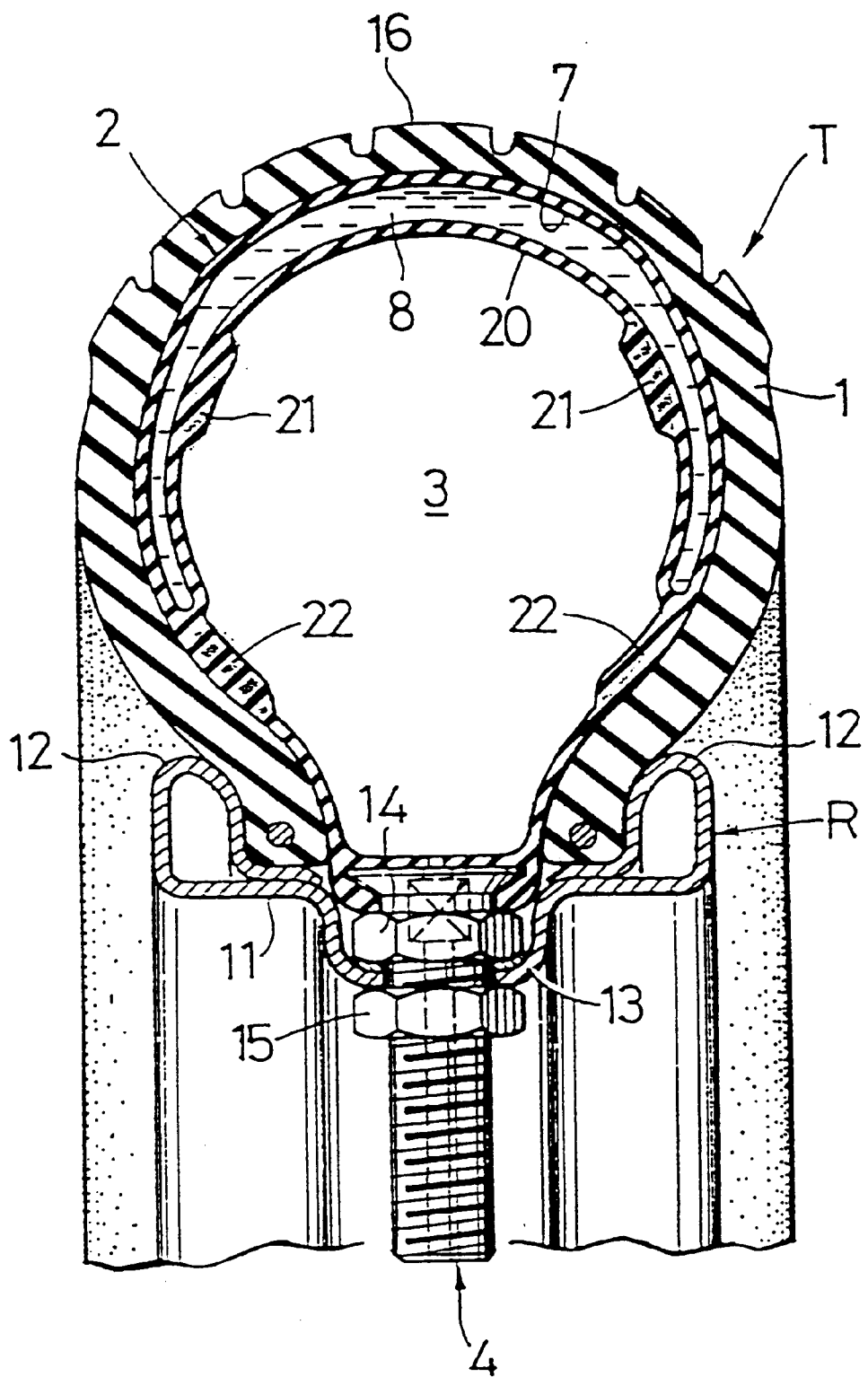
FIG. 4 is a cross-sectional view of a wheel mounted with a tire including a tube in accordance with a third embodiment of the present invention.

Next, an explanation will be given of a third embodiment of the present invention with reference to FIG. 4 and FIG. 5.

The tube 2 in the third embodiment is divided into an air chamber 3 on the inner side thereof in the radial direction and a sealing agent chamber 7 on the outer side thereof in the radial direction by a partition wall 20 and a sealing agent 8 is injected into the sealing agent chamber 7. A pair of first thick wall portions 21 corresponding to the thick wall portions 17 in the first embodiment are integrally formed with the partition wall 20 facing the air chamber 3 and a pair of second thick wall portions 22 capable of coming into contact with the first thick wall portions 21 are integrally formed with portions of the tube 2 in the proximity of the pair of flange portions 12 of the rim R.

Next, an explanation will be given of the operation of the third embodiment.

The sealing agent chamber 7 of the tube 2 is maintained in a shape alongside the inner face of the tire 1 by the air pressure of the air chamber 3 and accordingly, even if a centrifugal force caused by rotating the wheel is exerted thereon, the sealing agent 8 sealed in the sealing agent chamber 7 is not deviated from the side of side faces of the tube 2 to the outer periphery side thereof. Accordingly, even if the sealing agent chamber 7 of the tube 2 is pierced by a nail etc. in the radial direction or from the sides thereof, the sealing agent 8 immediately repairs the pierced flaw by filling it up whereby the leakage of air from the air chamber 3 is retarded.

Further, the sealing agent 8 is held in the sealing agent chamber 7 and does not flow out to the side of the air chamber 3 and accordingly, the air valve 4 or a pressure gage etc. attached thereto is not clogged.

Figure 5:
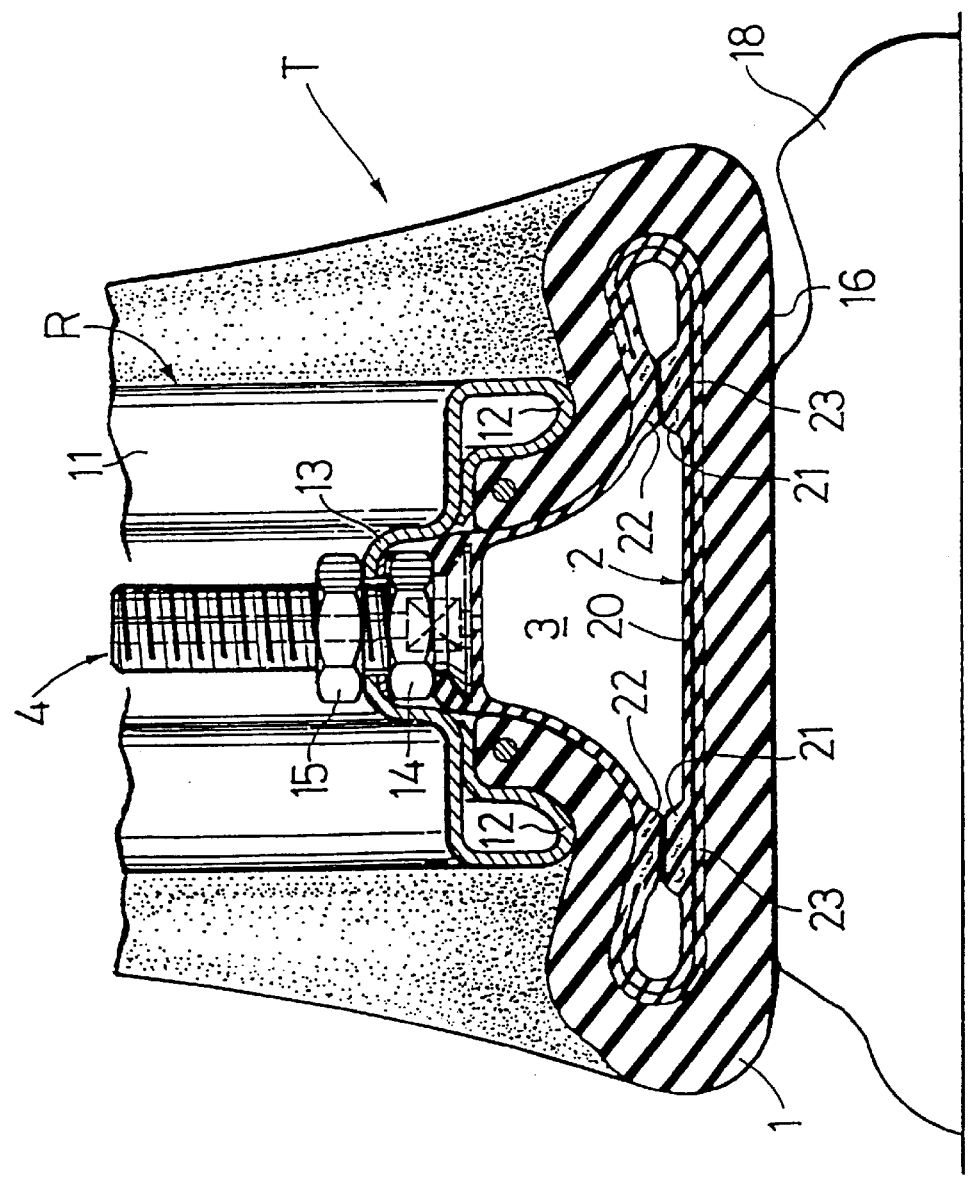
FIG. 5 is an explanatory view of the operation.

When the tire T including a tube travels on a hazard 18 on the road and portions of the tire 1 and the tube 2 are compressed in the radial direction as illustrated in FIG. 5, the tire 1 and the tube 2 are squeezed between the flange portions 12 of the rim R and the hazard 18 and the thick wall portions 21 and 22 of the tube 2 are mutually brought into contact. However, the thick wall portions 21 and 22 which have an increased strength are not damaged. Also, the thin wall portions 23 of the tube 2 which are in contact with the thick wall portions 21 are protected against damage since the load is dispersed in the thick wall portions 21.

Furthermore, according to the third embodiment the occurrence of a shock puncture can be avoided also by a simple structure in which only the thick wall portions 21 and 22 having a larger wall thickness than that of the other portions are formed at portions of the tube 2 and the weight or the production cost of the tire T including a tube is not considerably increased.

Although the detailed description has been given of the embodiments of the present invention as mentioned above, various modifications of design are possible so far as they are within a range not deviated from the gist of the present invention.

For example, if the wall thickness of the thin wall portions 19 is increased to constitute thick wall portions in the first and the second embodiment, the puncture can more firmly be prevented and similarly, when the wall thickness of the thin wall portions 23 is increased to constitute thick wall portions in the third embodiment, the puncture can more firmly be prevented.

As stated above, according to the present invention, thick wall portions are formed at at least one of the inner wall faces of a tube which are mutually brought into contact by being squeezed by a tire and a rim when a load in the radial direction is exerted on the tire and therefore, even if the tube is strongly squeezed between the tire and the rim by exerting a large load on the tire, the damage and the puncture caused thereby of the tube can firmly be avoided. Furthermore, the present invention is provided with a simple structure in which only the thick wall portions are formed at portions of the tube and therefore, no increase in weight occurs and no increase in the production cost occurs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire including a tube comprising:
a tire having an outer ground engaging portion, a pair of sidewalls integrally formed to opposite sides of said outer ground engaging portion and extending radially inward, and radially inner edges of said sidewalls being adapted to abut against a rim of a wheel;
a hollow tube having walls, an outer surface of said walls forming a toroidal shape, said tube being adapted to fit inside a space formed between said sidewalls and adjacent to a radial underside of said ground engaging portion, a majority of said walls of said tube having a substantially uniform first thickness; and
a first pair of circumferential strips, said first pair of circumferential strips being attached to an inner surface of said walls of said tube and being so position on said walls that upon said ground engaging portion of said tire deforming toward said radially inner edges of said sidewalls, said first pair of circumferential strips will overlay the rim of the wheel.

2. The tire including a tube according to claim 1, wherein said first pair of circumferential strips are attached to said walls of said tube which are located adjacent said radial underside of said ground engaging portion.

3. The tire including a tube according to claim 2, wherein said first pair of circumferential strips are integrally formed with said walls of said tube.

4. The tire including a tube according to claim 1, wherein said first pair of circumferential strips are attached to said walls of said tube which are located beside a portion of said sidewalls adjacent said radially inner edges of said sidewalls.

5. The tire including a tube according to claim 4, wherein said first pair of circumferential strips are integrally formed with said walls of said tube.

6. The tire including a tube according to claim 1, further comprising:

a second pair of circumferential strips, said second pair of circumferential strips being attached to said inner surface of said walls of said tube and being so position on said walls that upon said ground engaging portion of said tire deforming toward said radially inner edges of said sidewalls, said second pair of circumferential strips will overlay the rim of the wheel.

7. The tire including a tube according to claim 6, wherein said first pair of circumferential strips are attached to said walls of said tube which are located adjacent said radial underside of said ground engaging portion, and wherein said second pair of circumferential strips are attached to said walls of said tube which are located beside a portion of said sidewalls adjacent said radially inner edges of said sidewalls.

8. The tire including a tube according to claim 1, further comprising:

two chambers formed inside said walls of said tube, a first of said two chambers being located adjacent said radial underside of said ground engaging portion and being adapted to contain a sealing agent, a second chamber of said two chambers being adapted to contain air.

9. The tire including a tube according to claim 8, wherein said first chamber is also located adjacent portions of said sidewalls.

10. The tire including a tube according to claim 1, wherein said first pair of circumferential strips have a substantially uniform thickness.

11. A tube for a tire, the tire including an outer ground engaging portion, a pair of sidewalls integrally formed to opposite sides of the outer ground engaging portion and extending radially inward, and radially inner edges of the sidewalls being adapted to abut against a rim of a wheel, said tube comprising:

walls, an outer surface of said walls forming a toroidal shape, said tube being adapted to fit inside a space formed between the sidewalls and adjacent to a radial underside of the ground engaging portion, a majority of said walls of said tube having a substantially uniform first thickness; and a first pair of circumferential strips, said first pair of circumferential strips being attached to an inner surface of said walls of said tube and being so position on said walls that upon the ground engaging portion of the tire deforming toward the radially inner edges of the sidewalls, said first pair of circumferential strips will overlay the rim of the wheel.

12. The tube according to claim 11, wherein said first pair of circumferential strips are attached to said walls of said tube which are located adjacent the radial underside of the ground engaging portion when said tube is installed in the tire; and wherein said first pair of circumferential strips are integrally formed with said walls of said tube.

13. The tube according to claim 11, wherein said first pair of circumferential strips are attached to said walls of said tube which are located beside a portion of the sidewalls adjacent the radially inner edges of the sidewalls when said tube is installed in the tire; and wherein said first pair of circumferential strips are integrally formed with said walls of said tube.

14. The tube according to claim 11, further comprising:

a second pair of circumferential strips, said second pair of circumferential strips being attached to said inner surface of said walls of said tube and being so position on said walls that upon the ground engaging portion of the tire deforming toward the radially inner edges of the sidewalls, said second pair of circumferential strips will overlay the rim of the wheel.

15. The tube according to claim 14, wherein said first pair of circumferential strips are attached to said walls of said tube which are located adjacent the radial underside of the ground engaging portion, and wherein said second pair of circumferential strips are attached to said walls of said tube which are located beside a portion of the sidewalls adjacent the radially inner edges of the sidewalls when said tube is in the tire.

16. The tube according to claim 11, further comprising:

two chambers formed inside said walls of said tube, a first of said two chambers being located adjacent the radial underside of the ground engaging portion when said tube is located in the tire and being adapted to contain a sealing agent, a second chamber of said two chambers being adapted to contain air.

17. The tube according to claim 16, wherein said first chamber is also located adjacent portions of the sidewalls when said tube is located in the tire.

18. The tube according to claim 11, wherein said first pair of circumferential strips have a substantially uniform thickness.

19. A tire including a tube comprising:

a tire mounted on an outer periphery of a rim;

a tube positioned in a space formed between the rim and the tire, said tube including an inner wall surface;

thick wall portions formed at at least one of the inner wall surfaces of the tube which are mutually brought into contact by being squeezed by the tire and the rim when a load in a radial direction is exerted on the tire; and a chamber formed in the thickness of said tube for containing a sealing agent disposed therein.

* * * * *